(12) United States Patent
Liu et al.

(10) Patent No.: US 11,984,939 B2
(45) Date of Patent: May 14, 2024

(54) METHODS AND DEVICES FOR INTER-CELL INTERFERENCE ESTIMATION

(71) Applicant: Telefonaktiebolaget LM Ericsson (publ), Stockholm (SE)

(72) Inventors: Chunhui Liu, Beijing (CN); Erik Eriksson, Linköping (SE); Qi Zhang, Beijing (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 378 days.

(21) Appl. No.: 17/426,401

(22) PCT Filed: Mar. 7, 2019

(86) PCT No.: PCT/CN2019/077290
§ 371 (c)(1),
(2) Date: Jul. 28, 2021

(87) PCT Pub. No.: WO2020/177114
PCT Pub. Date: Sep. 10, 2020

(65) Prior Publication Data
US 2022/0103269 A1 Mar. 31, 2022

(51) Int. Cl.
*H04B 17/345* (2015.01)
*H04B 7/06* (2006.01)
(Continued)

(52) U.S. Cl.
CPC ......... *H04B 17/345* (2015.01); *H04B 7/0695* (2013.01); *H04B 17/26* (2015.01); *H04L 5/0073* (2013.01)

(58) Field of Classification Search
CPC .... H04B 17/345; H04B 7/0695; H04B 17/26; H04B 17/391; H04L 5/0073; H04W 52/346; H04W 16/18
See application file for complete search history.

(56) References Cited

U.S. PATENT DOCUMENTS 8,126,403 B2 * 2/2012 Wang Helmersson ...................... H04W 52/367
455/501
8,259,601 B2 9/2012 Fu
(Continued)

FOREIGN PATENT DOCUMENTS

| CN | 101047937 A | 10/2007 |
|---|---|---|
| CN | 105516992 A | 4/2016 |
| WO | 1999012370 | 3/1999 |
| WO | 2006099548 A1 | 9/2006 |

OTHER PUBLICATIONS

Communication and Supplementary European Search Report dated May 3, 2022 for Patent Application No. 19917862.5, consisting of 12-pages.
(Continued)

*Primary Examiner* — Raj Jain
(74) *Attorney, Agent, or Firm* — Weisberg I.P. Law, P.A.

(57) ABSTRACT

The present disclosure provides a method (200) in a network device for uplink inter-cell interference estimation. The network device serves a cell divided into a plurality of sectors each corresponding to an angle range. The method (200) includes, for a first sector of the plurality of sectors: measuring (210) an uplink inter-cell interference level; and estimating (220) an uplink inter-cell interference metric based on the measured uplink inter-cell interference level.

18 Claims, 9 Drawing Sheets

(51) Int. Cl.
H04B 17/26 (2015.01)
H04L 5/00 (2006.01)

(56) References Cited

U.S. PATENT DOCUMENTS

| 8,594,685 | B2* | 11/2013 | Kronestedt | H04W 16/10 |
| | | | | 455/446 |
| 2005/0090244 | A1* | 4/2005 | Ammi | H04B 17/391 |
| | | | | 455/425 |
| 2009/0092059 | A1 | 4/2009 | Fu | |
| 2017/0187504 | A1* | 6/2017 | Qian | H04W 72/0466 |
| 2022/0103269 | A1* | 3/2022 | Liu | H04B 17/345 |

OTHER PUBLICATIONS

Xiangyou Lv et al.; Uplink Multi-user MIMO interference Cancellation Algorithm for LTE-A Systems; 2010 International Conference on Information Networking and Automation (ICINA); Oct. 18, 2010, consisting of 4-pages.

Alkhaled, Makram, et al., "Adaptive User Grouping Algorithm for the Downlink Massive MIMO Systems", IEEE Wireless Communications and Networking Conference (WCNC 2016)—Track 2—MAC and Cross Layer Design, 2016, pp. 1-6.

Bai, Zijian, et al., "Interference Estimation for Multi-Layer MU-MIMO Transmission in LTE-Advanced Systems", 2012 IEEE 23rd International Symposium on Personal, Indoor and Mobile Radio Communications—(PIMRC), 2012, pp. 1622-1626.

Deb, Supratim, et al., "Learning-Based Uplink Interference Management in 4G LTE Cellular Systems", IEEE, ACM Transactions on Networking, vol. 23, No. 2, Apr. 2015, pp. 398-411.

Li, Zhao, et al., "MU-MIMO Downlink Scheduling Based On Users' Correlation and Fairness", https://rtcl.eecs.umich.edu/papers/publications/2014/MU-MIMO%20Scheduling.pdf, 2014, pp. 1-6.

"3GPP TS 38.214 V15.1.0", 3rd Generation Partnership Project; Technical Specification Group Radio Access Network; NR; Physical layer procedures for data (Release 15), Mar. 2018, pp. 1-77.

* cited by examiner

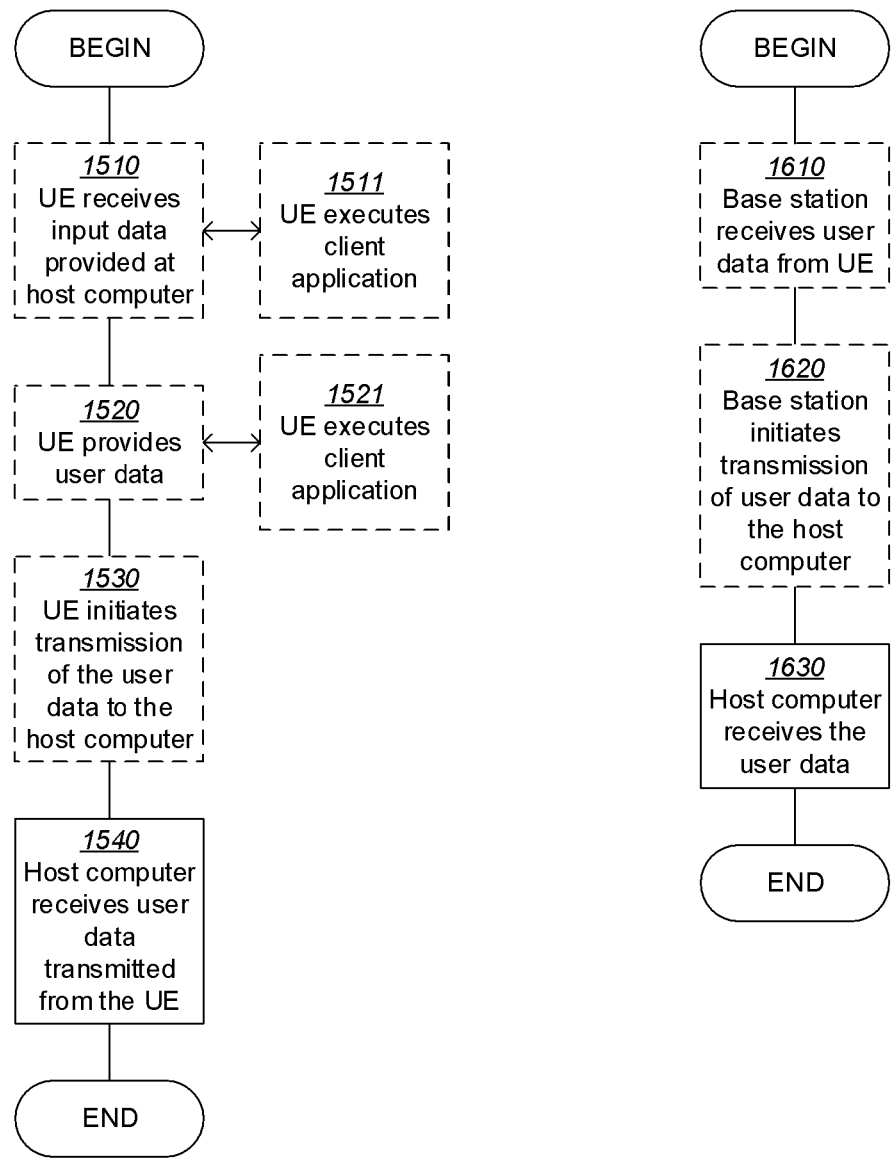

METHODS AND DEVICES FOR INTER-CELL INTERFERENCE ESTIMATION

TECHNICAL FIELD

The present disclosure relates to wireless communication, and more particularly, to methods and devices for inter-cell interference estimation.

BACKGROUND

Next generation cellular networks are expected to provide a set of mechanisms by which terminal devices (e.g., User Equipments, or UEs) and network devices (e.g., gNBs) can establish highly directional transmission links, typically using high-dimensional phased arrays, so as to benefit from the resulting beamforming gain and sustain an acceptable communication quality. Directional links, however, require fine alignment of transmitter beams and receiver beams, which is achieved through a set of operations known as beam management. The beam management operations are fundamental to a variety of control tasks including initial access, which allows an idle UE to establish a physical link connection with a gNB, beam tracking, which enables beam adaptation schemes for connected UEs, handover, path selection and radio link failure recovery procedures. These are detailed in the 3$^{rd}$ Generation Partnership Project (3GPP) Technical Specification (TS) 38.214, V15.1.0, which is incorporated herein by reference in its entirety.

A gNB can configure a Channel State Information-Reference Signal (CSI-RS) for a UE to measure available beams. Then, the UE can report a list of beam candidates to the gNB. Upon reception of the report, the gNB can select one of the beam candidates as a downlink beam for this UE. Then, an uplink beam can be selected for the UE based on the downlink beam when an uplink-downlink beam correspondence is configured, or based on an additional uplink reference signal from the UE. For details of the beam selection, reference can be made to TS 38.214.

For the purpose of link adaption for the uplink beam, e.g., to determine a Modulation and Coding Scheme (MCS) based on Signal to Interference plus Noise Ratio (SINR) associated with the UE, it is desired for the gNB to obtain an uplink interference in the direction of the uplink beam. Similarly, it may be desired for the UE to obtain a downlink interference in the direction of the downlink beam.

SUMMARY

It is an object of the present disclosure to provide methods and devices for inter-cell interference estimation.

In a first aspect of the present disclosure, a method in a network device for uplink inter-cell interference estimation is provided. The network device serves a cell divided into a plurality of sectors each corresponding to an angle range. The method includes, for a first sector of the plurality of sectors: measuring an uplink inter-cell interference level; and estimating an uplink inter-cell interference metric based on the measured uplink inter-cell interference level.

In an embodiment, the uplink inter-cell interference metric can be estimated further based on a pervious uplink inter-cell interference metric for the first sector.

In an embodiment, the operation of estimating may include calculating the uplink inter-cell interference metric based on the measured uplink inter-cell interference level, the previous uplink inter-cell interference metric and a filtering coefficient over time.

In an embodiment, the uplink inter-cell interference level may be measured and the uplink inter-cell interference metric may be estimated per frequency unit and/or per time unit.

In an embodiment, the frequency unit may be a sub-carrier and the time unit may be a Transmission Time Interval (TTI).

In an embodiment, the method may further include: estimating an uplink inter-cell interference level at a terminal device based on the uplink inter-cell interference metric estimated for the first sector and an angular distance between the terminal device and a center of the first sector.

In an embodiment, the operation of measuring the uplink inter-cell interference level for the first sector may include, for the first sector: measuring an uplink interference level; estimating a Multi-User (MU) interference level; and calculating the uplink inter-cell interference level by removing the MU interference level from the uplink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In an embodiment, the uplink inter-cell interference metric for the first sector may be estimated further based on an uplink inter-cell interference metric for a second sector of the plurality of sectors.

In a second aspect of the present disclosure, a method in a network device for uplink inter-cell interference estimation is provided. The network device serves a cell divided into a plurality of sectors each corresponding to an angle range. The method includes: measuring an uplink inter-cell interference level for a first sector of the plurality of sectors; and estimating an uplink inter-cell interference metric for a second sector of the plurality of sectors based on the uplink inter-cell interference level measured for the first sector.

In an embodiment, the operation of estimating may include calculating the uplink inter-cell interference metric based on the uplink inter-cell interference level measured for the first sector and a coefficient dependent on an angular distance between a center of the first sector and a center of the second sector.

In an embodiment, the uplink inter-cell interference metric can be estimated further based on a previous uplink inter-cell interference metric for the second sector.

In an embodiment, the operation of estimating may include calculating the uplink inter-cell interference metric based on the uplink inter-cell interference level measured for the first sector, the previous uplink inter-cell interference metric for the second sector, a filtering coefficient over time and a coefficient dependent on an angular distance between a center of the first sector and a center of the second sector.

In an embodiment, the uplink inter-cell interference level may be measured and the uplink inter-cell interference metric may be estimated per frequency unit and/or per time unit.

In an embodiment, the frequency unit may be a sub-carrier and the time unit may be a TTI.

In an embodiment, the method may further include estimating an uplink inter-cell interference level at a terminal device based on the uplink inter-cell interference metric estimated for the second sector and an angular distance between the terminal device and a center of the second sector.

In an embodiment, the operation of measuring the uplink inter-cell interference level for the first sector may include, for the first sector: measuring an uplink interference level; estimating an MU interference level; and calculating the uplink inter-cell interference level by removing the MU interference level from the uplink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In a third aspect of the present disclosure, a network device is provided. The network device includes a transceiver, a processor and a memory. The memory contains instructions executable by the processor whereby the network device is operative to perform the method according to the above first or second aspect.

In a fourth aspect of the present disclosure, a computer readable storage medium is provided. The computer readable storage medium has computer program instructions stored thereon. The computer program instructions, when executed by a processor in a network device, cause the network device to perform the method according to the above first or second aspect.

In a fifth aspect of the present disclosure, a method in a terminal device for downlink inter-cell interference estimation is provided. The terminal device operates in a cell divided into a plurality of sectors each corresponding to an angle range. The method includes, for a first sector of the plurality of sectors: measuring a downlink inter-cell interference level; and estimating a downlink inter-cell interference metric based on the measured downlink inter-cell interference level.

In an embodiment, the downlink inter-cell interference metric can be estimated further based on a pervious downlink inter-cell interference metric for the first sector.

In an embodiment, the operation of estimating may include calculating the downlink inter-cell interference metric based on the measured downlink inter-cell interference level, the previous downlink inter-cell interference metric and a filtering coefficient over time.

In an embodiment, the downlink inter-cell interference level may be measured and the downlink inter-cell interference metric may be estimated per frequency unit and/or per time unit.

In an embodiment, the frequency unit may be a subcarrier and the time unit may be a TTI.

In an embodiment, the method may further include estimating a downlink inter-cell interference level at a network device based on the downlink inter-cell interference metric estimated for the first sector and an angular distance between the network device and a center of the first sector.

In an embodiment, the operation of measuring the downlink inter-cell interference level for the first sector may include, for the first sector: measuring a downlink interference level; estimating an MU interference level; and calculating the downlink inter-cell interference level by removing the MU interference level from the downlink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In an embodiment, the downlink inter-cell interference metric for the first sector may be estimated further based on a downlink inter-cell interference metric for a second sector of the plurality of sectors.

In a sixth aspect of the present disclosure, a method in a terminal device for downlink inter-cell interference estimation. The terminal device operates in a cell divided into a plurality of sectors each corresponding to an angle range. The method includes: measuring a downlink inter-cell interference level for a first sector of the plurality of sectors; and estimating a downlink inter-cell interference metric for a second sector of the plurality of sectors based on the downlink inter-cell interference level measured for the first sector.

In an embodiment, the operation of estimating may include calculating the downlink inter-cell interference metric based on the downlink inter-cell interference level measured for the first sector and a coefficient dependent on an angular distance between a center of the first sector and a center of the second sector.

In an embodiment, the downlink inter-cell interference metric can be estimated further based on a previous downlink inter-cell interference metric for the second sector.

In an embodiment, the operation of estimating may include calculating the downlink inter-cell interference metric based on the downlink inter-cell interference level measured for the first sector, the previous downlink inter-cell interference metric for the second sector, a filtering coefficient over time and a coefficient dependent on an angular distance between a center of the first sector and a center of the second sector.

In an embodiment, the downlink inter-cell interference level may be measured and the downlink inter-cell interference metric may be estimated per frequency unit and/or per time unit.

In an embodiment, the frequency unit may be a subcarrier and the time unit may be a TTI.

In an embodiment, the method may further include estimating a downlink inter-cell interference level at a network device based on the downlink inter-cell interference metric estimated for the second sector and an angular distance between the network device and a center of the second sector.

In an embodiment, the operation of measuring the downlink inter-cell interference level for the first sector may include, for the first sector: measuring a downlink interference level; estimating an MU interference level; and calculating the downlink inter-cell interference level by removing the MU interference level from the downlink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In a seventh aspect of the present disclosure, a terminal device is provided. The terminal device includes a transceiver, a processor and a memory. The memory contains instructions executable by the processor whereby the terminal device is operative to perform the method according to the above fifth or sixth aspect.

In an eighth aspect of the present disclosure, a computer readable storage medium is provided. The computer readable storage medium has computer program instructions stored thereon. The computer program instructions, when executed by a processor in a terminal device, cause the terminal device to perform the method according to the above fifth or sixth aspect.

With the embodiments of the present disclosure, a cell can be divided into a plurality of sectors each corresponding to an angle range. A network device can estimate an uplink inter-cell interference metric for a sector based on an uplink inter-cell interference level measured for the sector or for another sector. Similarly, a terminal device can estimate a downlink inter-cell interference metric for a sector based on a downlink inter-cell interference level measured for the sector or for another sector.

BRIEF DESCRIPTION OF THE DRAWINGS

The above and other objects, features and advantages will be more apparent from the following description of embodiments with reference to the figures, in which:

FIGS. 13 to 16 are flowcharts illustrating methods implemented in a communication system including a host computer, a base station and a user equipment.

DETAILED DESCRIPTION

Figure 1A:
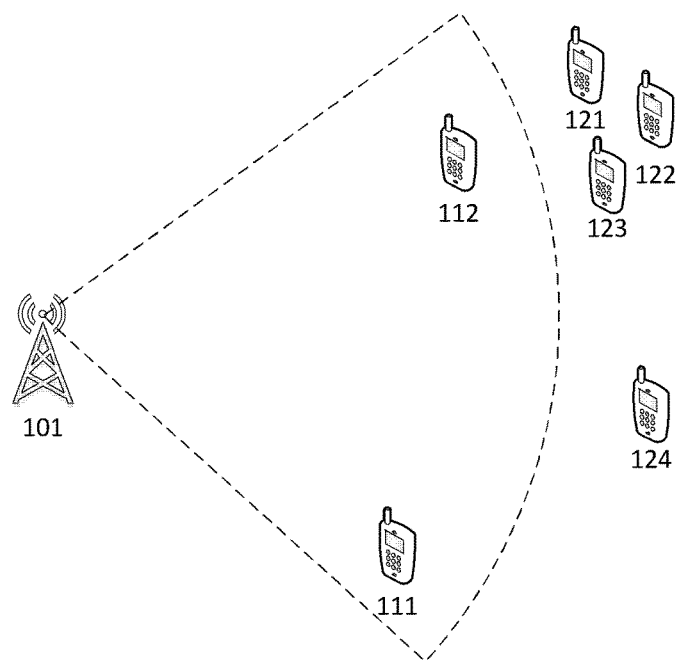
FIG. 1A is a schematic diagram showing an exemplary network scenario in which a network device operates with a wide receiving beam.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1A is a schematic diagram showing an exemplary network scenario where a network device 101 serves a cell with a wide receiving beam, as shown in dashed lines. UEs 111 and 112 operate in the cell and are covered by the wide receiving beam. UEs 121, 122, 123 and 124 are interferers from intra-frequency neighboring cells. In this case, the uplink interference is symmetric over the entire receiving beam, regardless of specific locations of the interfered and interfering UEs. Since only a wide-beam reception is performed by the network device 101, the uplink interference can be sampled continuously and can quickly converge, such that its variation over time can be tracked timely. For details of the uplink interference measurement and tracking, reference can be made to e.g., U.S. Pat. No. 8,259,601B2, WO1999012370A3, and Supratim Deb, et al., Learning-Based Uplink Interference Management in 4G LTE Cellular Systems, IEEE/ACM Transactions on Networking (TON), Vol. 23, Issue 2, p. 398-411, April 2015.

For simplicity, assuming only one interferer (e.g., UE 121) in an intra-frequency neighboring cell, received signals at the network device 101 can be expressed as:

$$R_1 = W(S_1 H_1 = IG) = WS_1 H_1 + WIG \quad (1)$$

$$R_2 = W(S_2 H_2 = IG) = WS_2 H_2 + WIG \quad (2)$$

where $R_1$ and $R_2$ denote signals received at the network device 101, $S_1$ denotes a signal transmitted from the UE 111, $S_2$ denotes a signal transmitted from the UE 112, I denotes an interfering signal transmitted from the interferer (which can be considered as an omnidirectional signal for simplicity), $H_1$ denotes an uplink channel from the UE 111 to the network device 101, $H_2$ denotes an uplink channel from the UE 112 to the network device 101, G denotes an uplink channel from the interferer to the network device 101, and W denotes a beamforming weight for the wide receiving beam. It can be seen from Equations (1) and (2) that the received signals $R_1$ and $R_2$ contain the same uplink inter-cell interference, i.e., WIG.

Figure 1B:
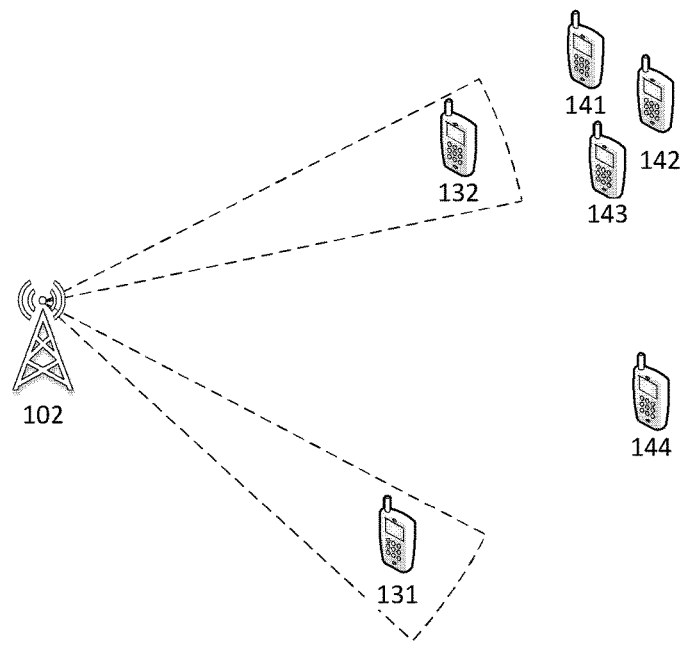
FIG. 1B is a sequence diagram showing another exemplary network scenario in which a network device operates with narrow receiving beams.

When a network device is equipped with massive Multiple Input Multiple Output (MIMO) antennas, highly directional uplink receiving beams can be applied to achieve a beamforming gain by means of link adaptation. FIG. 1B is a schematic diagram showing another exemplary network scenario where a network device 102 serves UEs 131 and 132 with narrow receiving beams. UEs 141, 142, 143 and 144 are interferers from intra-frequency neighboring cells. In this case, as the interfering UEs are asymmetrically distributed, the uplink interference is asymmetric due to directional uplink reception. In other words, uplink signals from UEs at different locations may experience different uplink interference levels.

Again, assuming only one interferer (e.g., UE 141) in an intra-frequency neighboring cell, received signals at the network device 102 can be expressed as:

$$R'_1 = W_1(S'_1 H'_1 = I'G') = W_1 S'_1 H'_1 + W_1 I'G' \quad (3)$$

$$R'_2 = W_2(S'_2 H'_2 = I'G') = W_2 S'_2 H'_2 + W_2 I'G' \quad (4)$$

where $R'_1$ and $R'_2$ denote signals received at the network device 102, $S'_1$ denotes a signal transmitted from the UE 131, S'$_2$ denotes a signal transmitted from the UE 132, I' denotes an interfering signal transmitted from the interferer, H'$_2$ denotes an uplink channel from the UE 131 to the network device 102, H'$_2$ denotes an uplink channel from the UE 132 to the network device 102, G' denotes an uplink channel from the interferer to the network device 102, W$_1$ denotes a beamforming weight for the narrow receiving beam for the UE 131 and W$_2$ denotes a beamforming weight for the narrow receiving beam for the UE 132. It can be seen from Equations (3) and (4) that the received signals R'$_1$ and R'$_2$ contain different uplink inter-cell interferences, i.e., W$_1$I'G' and W$_2$I'G', respectively.

In the case shown in FIG. 1B, if one single uplink inter-cell interference measurement is used in the entire cell, i.e., for different locations/directions, there may be a problem of inaccurate interference measurement and thus inaccurate SINR estimation. On the other hand, if uplink inter-cell interference measurements for a large number of narrow beams in different directions are to be maintained, a large storage capacity will be required, the interference measurements cannot converge quickly and their variations over time cannot be tracked timely.

The above also applies to downlink inter-cell interference, e.g., when a UE is equipped with MIMO antennas and receives downlink signals from different network devices with different narrow receiving beams.

Figure 2:
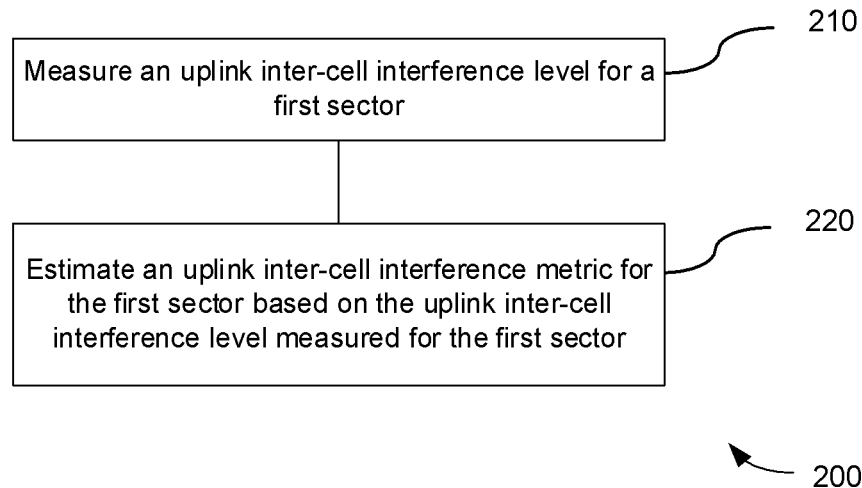
FIG. 2 is a flowchart illustrating a method in a network device according to an embodiment of the present disclosure.

FIG. 2 is a flowchart illustrating a method 200 according to an embodiment of the present disclosure. The method 200 can be performed at a network device, e.g., a gNB.

Figure 3:
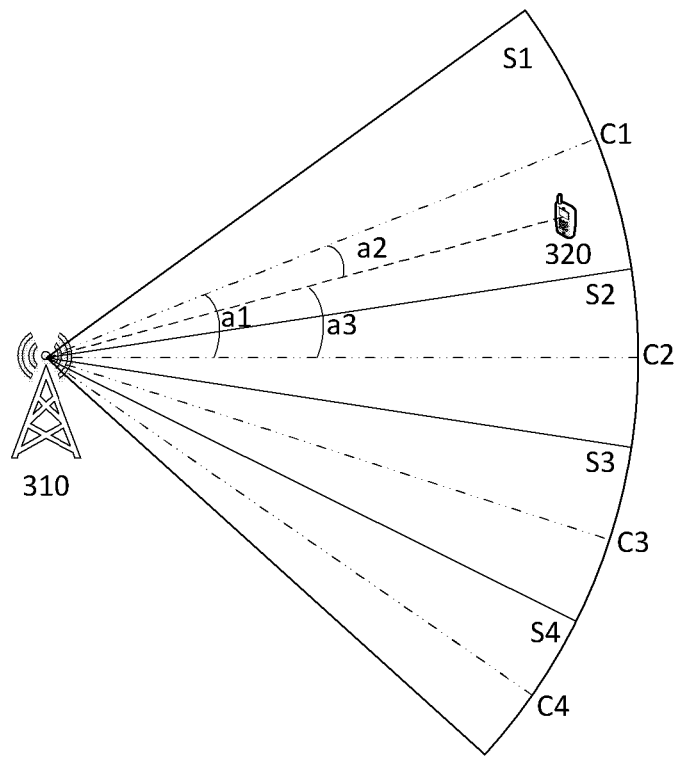
FIG. 3 is a schematic diagram showing an exemplary network scenario in which a network device serves a cell divided into a plurality of sectors.

The network device serves a cell that is divided into a plurality of sectors each corresponding to an angle range. FIG. 3 shows an exemplary network scenario in which a network device 310 serves a cell divided into a plurality of sectors, denoted as S1, S2, S3 and S4, respectively. Here, the angle ranges corresponding to the plurality of sectors may be equal, or at least two of the angle ranges corresponding to the plurality of sectors may be different. For example, the angle range corresponding to at least one sector of the plurality of sectors may be determined by a number of terminal devices in the sector, an amount of traffic in the sector or geography in the sector.

At block 210, an uplink inter-cell interference level is measured for a first sector of the plurality of sectors (e.g., the sector S1, S2, S3 or S4 in FIG. 3).

In an example, in the block 210, for the first sector, an uplink interference level can be measured and an intra-cell Multi-User (MU) interference level can be estimated. Then, the uplink inter-cell interference level for the first sector can be calculated by removing the MU interference level from the uplink interference level. For details of the MU interference estimation, reference can be made to e.g., Zijian Bai, et al., Interference Estimation for Multi-Layer MU-MIMO Transmission in LTE-Advanced Systems, IEEE 23$^{rd}$ International Symposium on Personal, Indoor and Mobile Radio Communications, 2012, or Makram Alkhaled, et al., Adaptive User Grouping Algorithm for the Downlink Massive MIMO Systems, IEEE Wireless Communications and Networking Conference, 2016.

At block 220, an uplink inter-cell interference metric is estimated for the first sector based on the measured uplink inter-cell interference level.

In an example, in the block 220, the uplink inter-cell interference metric can be estimated further based on a pervious uplink inter-cell interference metric for the first sector. In particular, the uplink inter-cell interference metric may be calculated based on the measured uplink inter-cell interference level, the previous uplink inter-cell interference metric and a filtering coefficient over time. For example, the uplink inter-cell interference level may be measured and the uplink inter-cell interference metric may be estimated per frequency unit and/or per time unit. The frequency unit may be a sub-carrier and the time unit may be a TTI. As a non-limiting example, the uplink inter-cell interference metric may be calculated as:

$$I_s[n][k] = \alpha I_s[n][k-1] + (1-\alpha)\delta_s[n][k] \quad (5)$$

where $I_s[n][k]$ denotes the uplink inter-cell interference metric for sector s (s=1, . . . , S, assuming the cell is divided into S sectors) at sub-carrier n and TTI k, $I_s[n][k-1]$ denotes a previous uplink inter-cell interference metric for sector s at sub-carrier n and TTI k−1 (this term can be omitted when k=1), $\delta_s[n][k]$ denotes the uplink inter-cell interference level measured for sector s at sub-carrier n and TTI k, and $\alpha$ is a filtering coefficient over time and has a value between 0 and 1 (e.g., $\alpha$=0.9).

In an example, in the block 220, the uplink inter-cell interference metric for the first sector may be estimated further based on an uplink inter-cell interference metric for a second sector of the plurality of sectors, e.g., based on the uplink inter-cell interference metric for the second sector and an angular distance between a center of the first sector and a center of the second sector. Referring to FIG. 3, center lines of the respective sectors S1~S4 are shown as C1~C4. For example, the uplink inter-cell interference metric for the sector S1 may be estimated further based on an uplink inter-cell interference metric for the sector S2 and an angular distance a1 between C1 and C2.

In an example, an uplink inter-cell interference level at a terminal device can be estimated based on the uplink inter-cell interference metric estimated for the first sector and an angular distance between the terminal device and a center of the first sector. Referring to FIG. 3, an uplink inter-cell interference level at a terminal device 320 can be estimated based on the uplink inter-cell interference metric estimated for the sector S1 and the angular distance a2 between the terminal device 320 and C1. Alternatively, the uplink inter-cell interference level at the terminal device 320 can be estimated based on the uplink inter-cell interference metric estimated for the sector S2 and the angular distance a3 between the terminal device 320 and C2.

Figure 4:
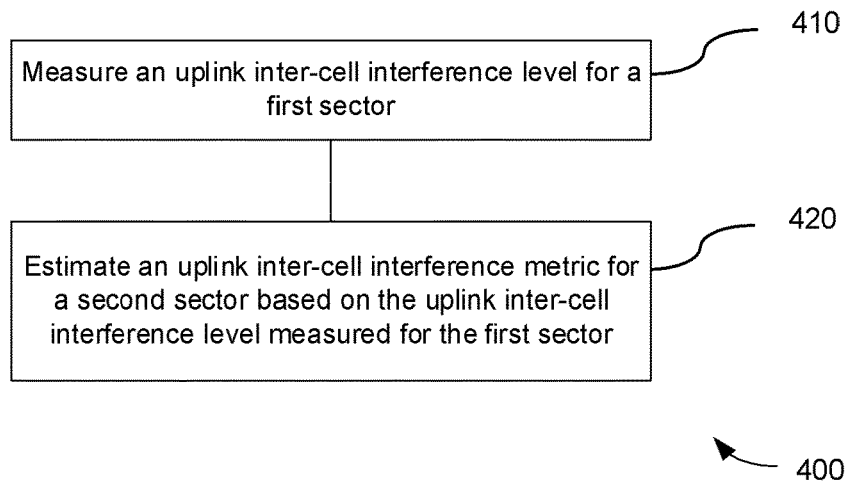
FIG. 4 is a flowchart illustrating a method in a network device according to another embodiment of the present disclosure.

FIG. 4 is a flowchart illustrating a method 400 according to an embodiment of the present disclosure. The method 400 can be performed at a network device, e.g., a gNB. The network device serves a cell that is divided into a plurality of sectors each corresponding to an angle range, as shown in FIG. 3. Here, the angle ranges corresponding to the plurality of sectors may be equal, or at least two of the angle ranges corresponding to the plurality of sectors may be different. For example, the angle range corresponding to at least one sector of the plurality of sectors may be determined by a number of terminal devices in the sector, an amount of traffic in the sector or geography in the sector.

At block 410, an uplink inter-cell interference level is measured for a first sector of the plurality of sectors (e.g., the sector S1, S2, S3 or S4 in FIG. 3).

In an example, in the block 410, for the first sector, an uplink interference level can be measured and an intra-cell MU interference level can be estimated. Then, the uplink inter-cell interference level for the first sector can be calculated by removing the MU interference level from the uplink interference level.

At block 420, an uplink inter-cell interference metric is estimated for a second sector of the plurality of sectors (e.g., another one of the sector S1, S2, S3 or S4 in FIG. 3) based on the uplink inter-cell interference level measured for the first sector In an example, in the block 420, the uplink inter-cell interference metric can be estimated based on the uplink inter-cell interference level measured for the first sector and a coefficient dependent on an angular distance between a center of the first sector and a center of the second sector. For example, referring to FIG. 3, the uplink inter-cell interference metric for the sector S1 may be estimated based on an uplink inter-cell interference level measured for the sector S2 and an angular distance a1 between C1 and C2.

In an example, the uplink inter-cell interference metric can be estimated further based on a previous uplink inter-cell interference metric for the second sector. In particular, the uplink inter-cell interference metric can be calculated based on the uplink inter-cell interference level measured for the first sector, the previous uplink inter-cell interference metric for the second sector, a filtering coefficient over time and a coefficient dependent on an angular distance between a center of the first sector and a center of the second sector. For example, the uplink inter-cell interference level may be measured and the uplink inter-cell interference metric may be estimated per frequency unit and/or per time unit. The frequency unit may be a sub-carrier and the time unit may be a TTI. As a non-limiting example, the uplink inter-cell interference metric may be calculated as:

$$I_s[n][k] = \alpha d_{s,l} I_s[n][k-1] + (1-\alpha)(1-d_{s,l})\delta_l[n][k] \quad (6)$$

where $I_s[n][k]$ denotes the uplink inter-cell interference metric for sector s (s=1, ..., S, assuming the cell is divided into S sectors) at sub-carrier n and TTI k, $I_s[n][k-1]$ denotes a previous uplink inter-cell interference metric for sector s at sub-carrier n and TTI k−1 (this term can be omitted when k=1), $\delta_l[n][k]$ denotes an uplink inter-cell interference level measured for sector l at sub-carrier n and TTI k, α is a filtering coefficient over time and has a value between 0 and 1, and $d_{s,l} \in [0,1]$ is a coefficient dependent on an angular distance between a center of the sector s and a center of the sector l.

In an example, an uplink inter-cell interference level at a terminal device can be estimated based on the uplink inter-cell interference metric estimated for the second sector and an angular distance between the terminal device and a center of the second sector. Referring to FIG. 3, an uplink inter-cell interference level at a terminal device 320 can be estimated based on the uplink inter-cell interference metric estimated for the sector S1 and the angular distance a2 between the terminal device 320 and C1. Alternatively, the uplink inter-cell interference level at the terminal device 320 can be estimated based on the uplink inter-cell interference metric estimated for the sector S2 and the angular distance a3 between the terminal device 320 and C2.

The above method 400 allows for a spatial or directional interpolation, i.e., estimating an uplink inter-cell interference metric for one sector based on an uplink inter-cell interference level measured for another sector. This enables quick convergence and timely tracking of the uplink inter-cell interference for a particular sector, even if there is no sufficient measurement data associated with that sector for a certain period of time.

The principles described above also apply to downlink inter-cell interference. That is, the principles of the present disclosure can also be applied to a terminal device for estimating downlink inter-cell interference.

Figure 5:
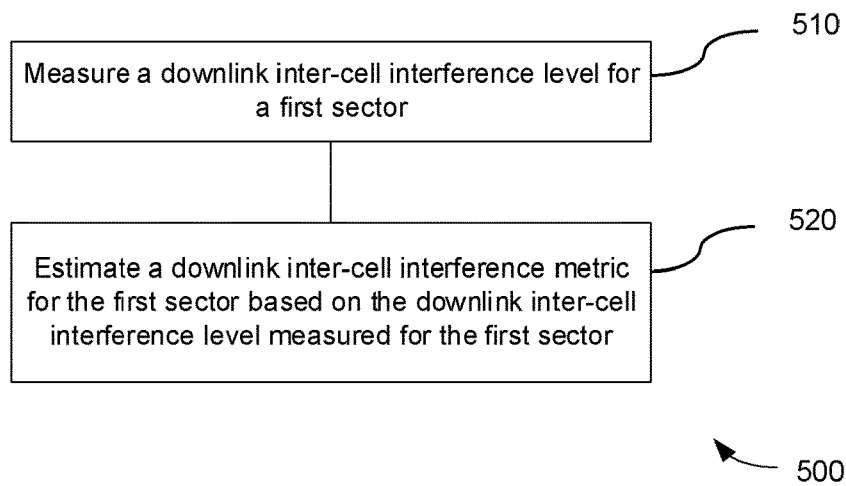
FIG. 5 is a flowchart illustrating a method in a terminal device according to an embodiment of the present disclosure.

FIG. 5 is a flowchart illustrating a method 500 according to an embodiment of the present disclosure. The method 500 can be performed at a terminal device, e.g., a UE. The terminal device operates in a cell divided into a plurality of sectors each corresponding to an angle range. Here, the angle ranges corresponding to the plurality of sectors may be equal, or at least two of the angle ranges corresponding to the plurality of sectors may be different. For example, the angle range corresponding to at least one sector of the plurality of sectors may be determined by a number of terminal devices in the sector, an amount of traffic in the sector or geography in the sector.

At block 510, a downlink inter-cell interference level is measured for a first sector of the plurality of sectors.

In an example, in the block 510, for the first sector, a downlink interference level can be measured and an intra-cell MU interference level can be estimated. Then, the downlink inter-cell interference level for the first sector can be calculated by removing the MU interference level from the downlink interference level.

At block 520, a downlink inter-cell interference metric is estimated for the first sector based on the measured downlink inter-cell interference level.

In an example, in the block 520, the downlink inter-cell interference metric can be estimated further based on a pervious downlink inter-cell interference metric for the first sector. In particular, the downlink inter-cell interference metric may be calculated based on the measured downlink inter-cell interference level, the previous downlink inter-cell interference metric and a filtering coefficient over time. For example, the downlink inter-cell interference level may be measured and the downlink inter-cell interference metric may be estimated per frequency unit and/or per time unit. The frequency unit may be a sub-carrier and the time unit may be a TTI. As a non-limiting example, the downlink inter-cell interference metric may be calculated as:

$$D_s[n][k] = \alpha D_s[n][k-1] + (1-\alpha)\theta_s[n][k] \quad (7)$$

where $D_s[n][k]$ denotes the downlink inter-cell interference metric for sector s (s=1, ..., S, assuming the cell is divided into S sectors) at sub-carrier n and TTI k, $D_s[n][k-1]$ denotes a previous downlink inter-cell interference metric for sector s at sub-carrier n and TTI k−1 (this term can be omitted when k=1), $\theta_s[n][k]$ denotes the downlink inter-cell interference level measured for sector s at frequency unit n and time unit k, and α is a filtering coefficient over time and has a value between 0 and 1 (e.g., α=0.9).

In an example, in the block 520, the downlink inter-cell interference metric for the first sector may be estimated further based on a downlink inter-cell interference metric for a second sector of the plurality of sectors, e.g., based on the downlink inter-cell interference metric for the second sector and an angular distance between a center of the first sector and a center of the second sector.

In an example, a downlink inter-cell interference level at a network device can be estimated based on the downlink inter-cell interference metric estimated for the first sector and an angular distance between the network device and a center of the first sector.

Figure 6:
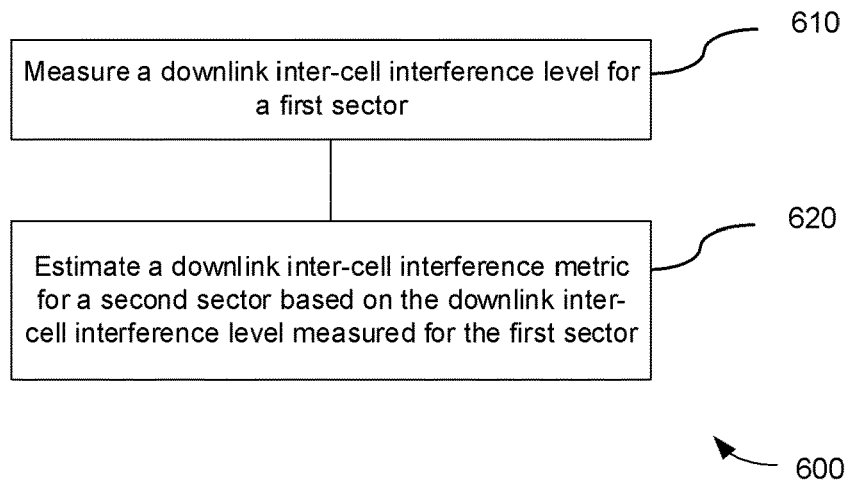
FIG. 6 is a flowchart illustrating a method in a terminal device according to another embodiment of the present disclosure.

FIG. 6 is a flowchart illustrating a method 600 according to an embodiment of the present disclosure. The method 600 can be performed at a terminal device, e.g., a UE. The terminal device operates in a cell divided into a plurality of sectors each corresponding to an angle range. Here, the angle ranges corresponding to the plurality of sectors may be equal, or at least two of the angle ranges corresponding to the plurality of sectors may be different. For example, the angle range corresponding to at least one sector of the plurality of sectors may be determined by a number of terminal devices in the sector, an amount of traffic in the sector or geography in the sector.

At block 610, a downlink inter-cell interference level is measured for a first sector of the plurality of sectors.

In an example, in the block 410, for the first sector, a downlink interference level can be measured and an intra-cell MU interference level can be estimated. Then, the downlink inter-cell interference level for the first sector can be calculated by removing the MU interference level from the downlink interference level.

At block 620, a downlink inter-cell interference metric is estimated for a second sector of the plurality of sectors based on the downlink inter-cell interference level measured for the first sector In an example, in the block 620, the downlink inter-cell interference metric can be estimated based on the downlink inter-cell interference level measured for the first sector and a coefficient dependent on an angular distance between a center of the first sector and a center of the second sector.

In an example, the downlink inter-cell interference metric can be estimated further based on a previous downlink inter-cell interference metric for the second sector. In particular, the downlink inter-cell interference metric can be calculated based on the downlink inter-cell interference level measured for the first sector, the previous downlink inter-cell interference metric for the second sector, a filtering coefficient over time and a coefficient dependent on an angular distance between a center of the first sector and a center of the second sector. For example, the downlink inter-cell interference level may be measured and the downlink inter-cell interference metric may be estimated per frequency unit and/or per time unit. The frequency unit may be a sub-carrier and the time unit may be a TTI. As a non-limiting example, the downlink inter-cell interference metric may be calculated as:

$$D_s[n][k]=\alpha d_{s,l}D_s[n][k-1]+(1-\alpha)(1-d_{s,l})\theta_l[n][k] \quad (8)$$

where $D_s[n][k]$ denotes the downlink inter-cell interference metric for sector s (s=1, ..., S, assuming the cell is divided into S sectors) at sub-carrier n and TTI k, $D_s[n][k-1]$ denotes a previous downlink inter-cell interference metric for sector s at sub-carrier n and TTI k−1 (this term can be omitted when k=1), $\theta_l[n][k]$ denotes a downlink inter-cell interference level measured for sector/at sub-carrier n and TTI k, $\alpha$ is a filtering coefficient over time and has a value between 0 and 1, and $d_{s,l} \in [0,1]$ is a coefficient dependent on an angular distance between a center of the sector s and a center of the sector l.

In an example, a downlink inter-cell interference level at a network device can be estimated based on the downlink inter-cell interference metric estimated for the second sector and an angular distance between the network device and a center of the second sector.

Figure 7:
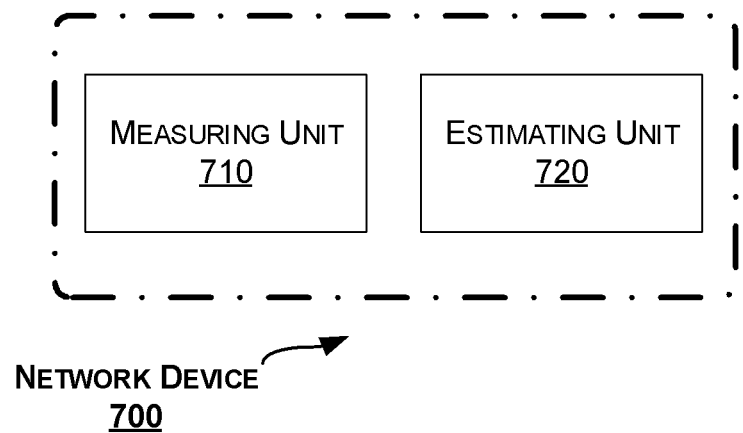
FIG. 7 is a block diagram of a network device according to an embodiment of the present disclosure.

Correspondingly to the method 200 or 400 as described above, a network device is provided. FIG. 7 is a block diagram of a network device 700 according to an embodiment of the present disclosure.

The network device 700 serves a cell divided into a plurality of sectors each corresponding to an angle range. As shown in FIG. 7, the network device 700 includes a measuring unit 710 configured to measure an uplink inter-cell interference level for a first sector of the plurality of sectors. The network device 700 further includes an estimating unit 720 configured to estimate an uplink inter-cell interference metric for the first sector based on the measured uplink inter-cell interference level.

In an embodiment, the uplink inter-cell interference metric can be estimated further based on a pervious uplink inter-cell interference metric for the first sector.

In an embodiment, the estimating unit 720 can be configured to calculate the uplink inter-cell interference metric based on the measured uplink inter-cell interference level, the previous uplink inter-cell interference metric and a filtering coefficient over time.

In an embodiment, the uplink inter-cell interference level may be measured and the uplink inter-cell interference metric may be estimated per frequency unit and/or per time unit.

In an embodiment, the frequency unit may be a sub-carrier and the time unit may be a TTI.

In an embodiment, the estimating unit 720 can further be configured to estimate an uplink inter-cell interference level at a terminal device based on the uplink inter-cell interference metric estimated for the first sector and an angular distance between the terminal device and a center of the first sector.

In an embodiment, the measuring unit 710 can be configured to, for the first sector: measure an uplink interference level; estimate an MU interference level; and calculate the uplink inter-cell interference level by removing the MU interference level from the uplink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In an embodiment, the uplink inter-cell interference metric for the first sector may be estimated further based on an uplink inter-cell interference metric for a second sector of the plurality of sectors.

Alternatively, the measuring unit 710 is configured to measure an uplink inter-cell interference level for a first sector of the plurality of sectors. The estimating unit 720 is configured to estimate an uplink inter-cell interference metric for a second sector of the plurality of sectors based on the uplink inter-cell interference level measured for the first sector.

In an embodiment, the estimating unit 720 can be configured to calculate the uplink inter-cell interference metric based on the uplink inter-cell interference level measured for the first sector and a coefficient dependent on an angular distance between a center of the first sector and a center of the second sector.

In an embodiment, the uplink inter-cell interference metric can be estimated further based on a previous uplink inter-cell interference metric for the second sector.

In an embodiment, the estimating unit 720 can be configured to calculate the uplink inter-cell interference metric based on the uplink inter-cell interference level measured for the first sector, the previous uplink inter-cell interference metric for the second sector, a filtering coefficient over time and a coefficient dependent on an angular distance between a center of the first sector and a center of the second sector.

In an embodiment, the uplink inter-cell interference level may be measured and the uplink inter-cell interference metric may be estimated per frequency unit and/or per time unit.

In an embodiment, the frequency unit may be a sub-carrier and the time unit may be a TTI.

In an embodiment, the estimating unit 720 can further be configured to estimate an uplink inter-cell interference level at a terminal device based on the uplink inter-cell interference metric estimated for the second sector and an angular distance between the terminal device and a center of the second sector.

In an embodiment, the measuring unit 710 can be configured to, for the first sector: measure an uplink interference level; estimate an MU interference level;

and calculate the uplink inter-cell interference level by removing the MU interference level from the uplink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

The units 710 and 720 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2 or 4.

Figure 8:
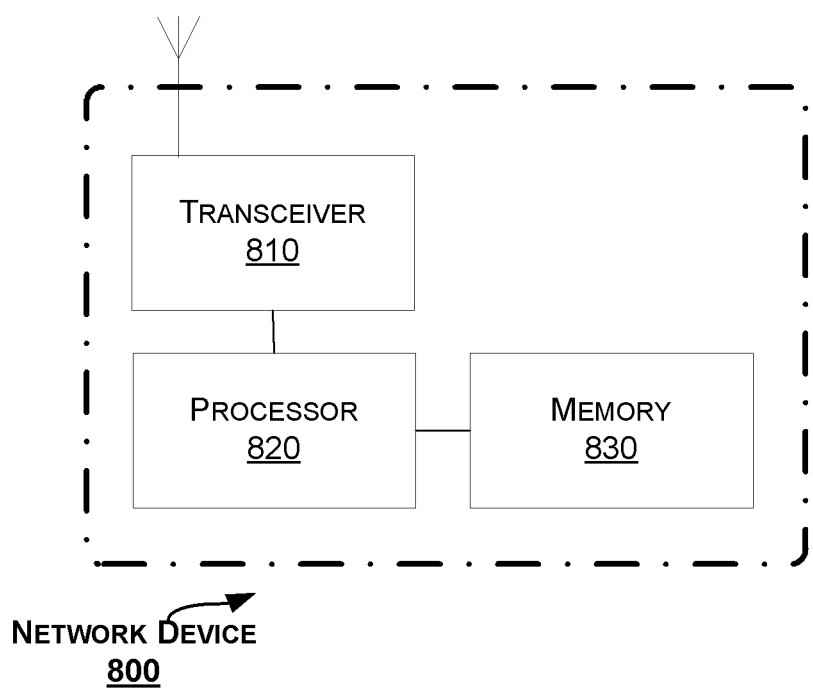
FIG. 8 is a block diagram of a network device according to another embodiment of the present disclosure.

FIG. 8 is a block diagram of a network device 800 according to another embodiment of the present disclosure.

The network device 800 serves a cell divided into a plurality of sectors each corresponding to an angle range. As shown in FIG. 8, the network device 800 includes a transceiver 810, a processor 820 and a memory 830. The memory 830 contains instructions executable by the processor 820 whereby the network device 800 is operative to perform the actions, e.g., of the procedure described earlier in conjunction with FIG. 2. Particularly, the memory 830 contains instructions executable by the processor 820 whereby the network device 800 is operative to, for a first sector of the plurality of sectors: measure an uplink inter-cell interference level; and estimate an uplink inter-cell interference metric based on the measured uplink inter-cell interference level.

In an embodiment, the uplink inter-cell interference metric can be estimated further based on a pervious uplink inter-cell interference metric for the first sector.

In an embodiment, the operation of estimating may include calculating the uplink inter-cell interference metric based on the measured uplink inter-cell interference level, the previous uplink inter-cell interference metric and a filtering coefficient over time.

In an embodiment, the uplink inter-cell interference level may be measured and the uplink inter-cell interference metric may be estimated per frequency unit and/or per time unit.

In an embodiment, the frequency unit may be a subcarrier and the time unit may be a TTI.

In an embodiment, the memory 830 may further contain instructions executable by the processor 820 whereby the network device 800 is operative to: estimate an uplink inter-cell interference level at a terminal device based on the uplink inter-cell interference metric estimated for the first sector and an angular distance between the terminal device and a center of the first sector.

In an embodiment, the operation of measuring the uplink inter-cell interference level for the first sector may include, for the first sector: measuring an uplink interference level; estimating an MU interference level; and calculating the uplink inter-cell interference level by removing the MU interference level from the uplink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In an embodiment, the uplink inter-cell interference metric for the first sector may be estimated further based on an uplink inter-cell interference metric for a second sector of the plurality of sectors.

Alternatively, the memory 830 contains instructions executable by the processor 820 whereby the network device 800 is operative to perform the actions, e.g., of the procedure described earlier in conjunction with FIG. 4. Particularly, the memory 830 contains instructions executable by the processor 820 whereby the network device 800 is operative to: measure an uplink inter-cell interference level for a first sector of the plurality of sectors; and estimate an uplink inter-cell interference metric for a second sector of the plurality of sectors based on the uplink inter-cell interference level measured for the first sector.

In an embodiment, the operation of estimating may include calculating the uplink inter-cell interference metric based on the uplink inter-cell interference level measured for the first sector and a coefficient dependent on an angular distance between a center of the first sector and a center of the second sector.

In an embodiment, the uplink inter-cell interference metric can be estimated further based on a previous uplink inter-cell interference metric for the second sector.

In an embodiment, the operation of estimating may include calculating the uplink inter-cell interference metric based on the uplink inter-cell interference level measured for the first sector, the previous uplink inter-cell interference metric for the second sector, a filtering coefficient over time and a coefficient dependent on an angular distance between a center of the first sector and a center of the second sector.

In an embodiment, the uplink inter-cell interference level may be measured and the uplink inter-cell interference metric may be estimated per frequency unit and/or per time unit.

In an embodiment, the frequency unit may be a subcarrier and the time unit may be a TTI.

In an embodiment, the memory 830 may further contain instructions executable by the processor 820 whereby the network device 800 is operative to: estimate an uplink inter-cell interference level at a terminal device based on the uplink inter-cell interference metric estimated for the second sector and an angular distance between the terminal device and a center of the second sector.

In an embodiment, the operation of measuring the uplink inter-cell interference level for the first sector may include, for the first sector: measuring an uplink interference level; estimating an MU interference level; and calculating the uplink inter-cell interference level by removing the MU interference level from the uplink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

Figure 9:
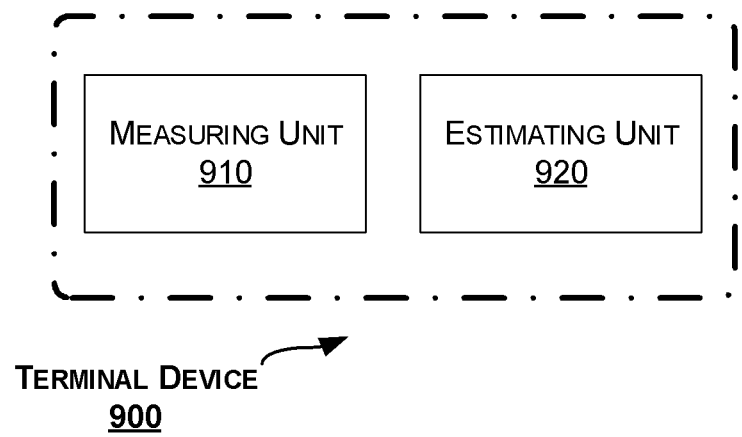
FIG. 9 is a block diagram of a terminal device according to an embodiment of the present disclosure.

Correspondingly to the method 500 or 600 as described above, a terminal device is provided. FIG. 9 is a block diagram of a terminal device 900 according to an embodiment of the present disclosure.

The terminal device 900 operates in a cell divided into a plurality of sectors each corresponding to an angle range. As shown in FIG. 9, the terminal device 900 includes a measuring unit 910 configured to measure a downlink inter-cell interference level for a first sector of the plurality of sectors. The terminal device 900 further includes an estimating unit 920 configured to estimate a downlink inter-cell interference metric for the first sector based on the measured downlink inter-cell interference level.

In an embodiment, the downlink inter-cell interference metric can be estimated further based on a pervious downlink inter-cell interference metric for the first sector.

In an embodiment, the estimating unit 920 can be configured to calculate the downlink inter-cell interference metric based on the measured downlink inter-cell interference level, the previous downlink inter-cell interference metric and a filtering coefficient over time.

In an embodiment, the downlink inter-cell interference level may be measured and the downlink inter-cell interference metric may be estimated per frequency unit and/or per time unit.

In an embodiment, the frequency unit may be a sub-carrier and the time unit may be a TTI.

In an embodiment, the estimating unit 920 can be configured to estimate a downlink inter-cell interference level at a network device based on the downlink inter-cell interference metric estimated for the first sector and an angular distance between the network device and a center of the first sector.

In an embodiment, the measuring unit 910 can be configured to, for the first sector: measure a downlink interference level; estimate an MU interference level; and calculate the downlink inter-cell interference level by removing the MU interference level from the downlink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In an embodiment, the downlink inter-cell interference metric for the first sector may be estimated further based on a downlink inter-cell interference metric for a second sector of the plurality of sectors.

Alternatively, the measuring unit 910 is configured to measure a downlink inter-cell interference level for a first sector of the plurality of sectors. The estimating unit 920 is configured to estimate a downlink inter-cell interference metric for a second sector of the plurality of sectors based on the downlink inter-cell interference level measured for the first sector.

In an embodiment, the estimating unit 920 is configured to calculate the downlink inter-cell interference metric based on the downlink inter-cell interference level measured for the first sector and a coefficient dependent on an angular distance between a center of the first sector and a center of the second sector.

In an embodiment, the downlink inter-cell interference metric can be estimated further based on a previous downlink inter-cell interference metric for the second sector.

In an embodiment, the estimating unit 920 is configured to calculate the downlink inter-cell interference metric based on the downlink inter-cell interference level measured for the first sector, the previous downlink inter-cell interference metric for the second sector, a filtering coefficient over time and a coefficient dependent on an angular distance between a center of the first sector and a center of the second sector.

In an embodiment, the downlink inter-cell interference level may be measured and the downlink inter-cell interference metric may be estimated per frequency unit and/or per time unit.

In an embodiment, the frequency unit may be a sub-carrier and the time unit may be a TTI.

In an embodiment, the estimating unit 920 can further be configured to estimate a downlink inter-cell interference level at a network device based on the downlink inter-cell interference metric estimated for the second sector and an angular distance between the network device and a center of the second sector.

In an embodiment, the measuring unit 910 can be configured to, for the first sector: measure a downlink interference level; estimate an MU interference level; and calculate the downlink inter-cell interference level by removing the MU interference level from the downlink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

The units 910 and 920 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 5 or 6.

Figure 10:
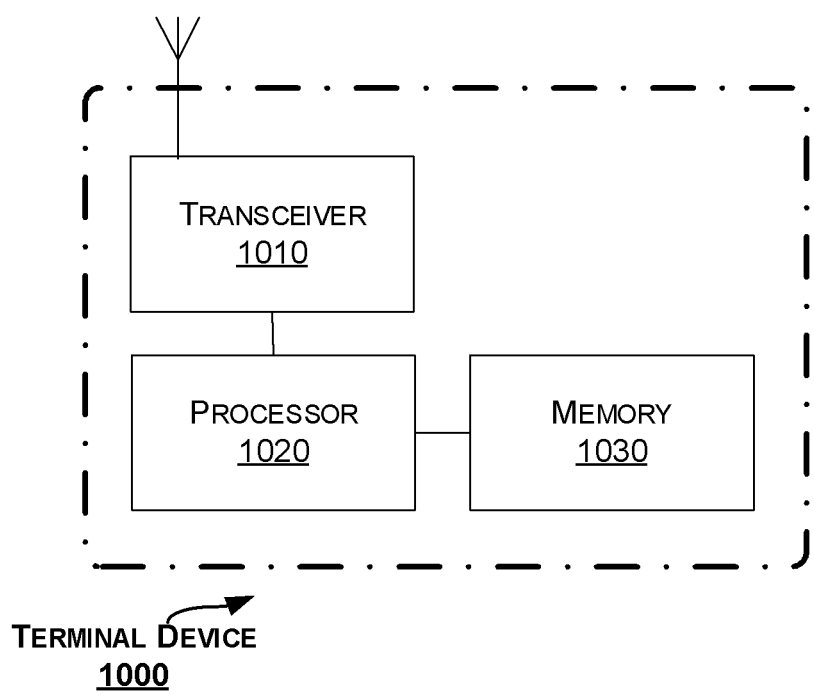
FIG. 10 is a block diagram of a terminal device according to another embodiment of the present disclosure.

FIG. 10 is a block diagram of a terminal device 1000 according to another embodiment of the present disclosure.

The terminal device 1000 operates in a cell divided into a plurality of sectors each corresponding to an angle range. As shown in FIG. 10, the terminal device 1000 includes a transceiver 1010, a processor 1020 and a memory 1030. The memory 1030 contains instructions executable by the processor 1020 whereby the terminal device 1000 is operative to perform the actions, e.g., of the procedure described earlier in conjunction with FIG. 5. Particularly, the memory 1030 contains instructions executable by the processor 1020 whereby the terminal device 1000 is operative to, for a first sector of the plurality of sectors: measure a downlink inter-cell interference level; and estimate a downlink inter-cell interference metric based on the measured downlink inter-cell interference level.

In an embodiment, the downlink inter-cell interference metric can be estimated further based on a pervious downlink inter-cell interference metric for the first sector.

In an embodiment, the operation of estimating may include calculating the downlink inter-cell interference metric based on the measured downlink inter-cell interference level, the previous downlink inter-cell interference metric and a filtering coefficient over time.

In an embodiment, the downlink inter-cell interference level may be measured and the downlink inter-cell interference metric may be estimated per frequency unit and/or per time unit.

In an embodiment, the frequency unit may be a subcarrier and the time unit may be a TTI.

In an embodiment, the memory 1030 may further contain instructions executable by the processor 1020 whereby the terminal device 1000 is operative to estimate a downlink inter-cell interference level at a network device based on the downlink inter-cell interference metric estimated for the first sector and an angular distance between the network device and a center of the first sector.

In an embodiment, the operation of measuring the downlink inter-cell interference level for the first sector may include, for the first sector: measuring a downlink interference level; estimating an MU interference level; and calculating the downlink inter-cell interference level by removing the MU interference level from the downlink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

In an embodiment, the downlink inter-cell interference metric for the first sector may be estimated further based on a downlink inter-cell interference metric for a second sector of the plurality of sectors.

Alternatively, the memory 1030 contains instructions executable by the processor 1020 whereby the terminal device 1000 is operative to perform the actions, e.g., of the procedure described earlier in conjunction with FIG. 6. Particularly, the memory 1030 contains instructions executable by the processor 1020 whereby the terminal device 1000 is operative to measure a downlink inter-cell interference level for a first sector of the plurality of sectors; and estimate a downlink inter-cell interference metric for a second sector of the plurality of sectors based on the downlink inter-cell interference level measured for the first sector.

In an embodiment, the operation of estimating may include calculating the downlink inter-cell interference metric based on the downlink inter-cell interference level measured for the first sector and a coefficient dependent on an angular distance between a center of the first sector and a center of the second sector.

In an embodiment, the downlink inter-cell interference metric can be estimated further based on a previous downlink inter-cell interference metric for the second sector.

In an embodiment, the operation of estimating may include calculating the downlink inter-cell interference metric based on the downlink inter-cell interference level measured for the first sector, the previous downlink inter-cell interference metric for the second sector, a filtering coefficient over time and a coefficient dependent on an angular distance between a center of the first sector and a center of the second sector.

In an embodiment, the downlink inter-cell interference level may be measured and the downlink inter-cell interference metric may be estimated per frequency unit and/or per time unit.

In an embodiment, the frequency unit may be a subcarrier and the time unit may be a TTI.

In an embodiment, the memory 1030 may further contain instructions executable by the processor 1020 whereby the terminal device 1000 is operative to estimate a downlink inter-cell interference level at a network device based on the downlink inter-cell interference metric estimated for the second sector and an angular distance between the network device and a center of the second sector.

In an embodiment, the operation of measuring the downlink inter-cell interference level for the first sector may include, for the first sector: measuring a downlink interference level; estimating an MU interference level; and calculating the downlink inter-cell interference level by removing the MU interference level from the downlink interference level.

In an embodiment, the angle ranges corresponding to the plurality of sectors may be equal.

In an embodiment, at least two of the angle ranges corresponding to the plurality of sectors may be different.

In an embodiment, the angle range corresponding to at least one sector of the plurality of sectors may be determined by a number of terminal devices in the sector, an amount of traffic in the sector or geography in the sector.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes:

code/computer readable instructions, which when executed by the processor 820 causes the network device 800 to perform the actions, e.g., of the procedure described earlier in conjunction with FIG. 2 or 4; or code/computer readable instructions, which when executed by the processor 1020 causes the terminal device 1000 to perform the actions, e.g., of the procedure described earlier in conjunction with FIG. 5 or 6.

The computer program product may be configured as a computer program code structured in computer program modules. The computer program modules could essentially perform the actions of the flow illustrated in FIG. 2, 4, 5 or 6.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 11:
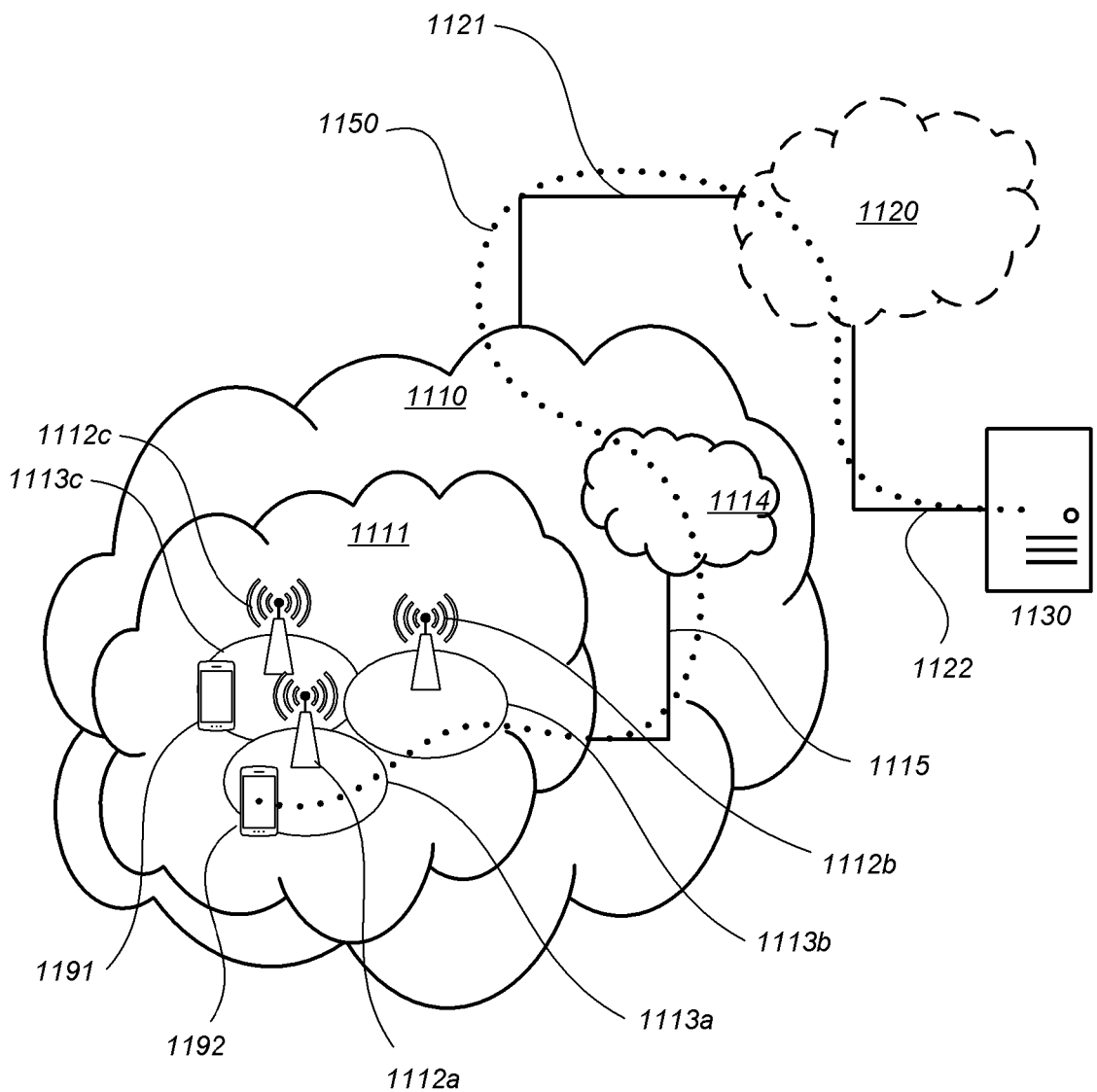
FIG. 11 schematically illustrates a telecommunication network connected via an intermediate network to a host computer.

With reference to FIG. 11, in accordance with an embodiment, a communication system includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first user equipment (UE) 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
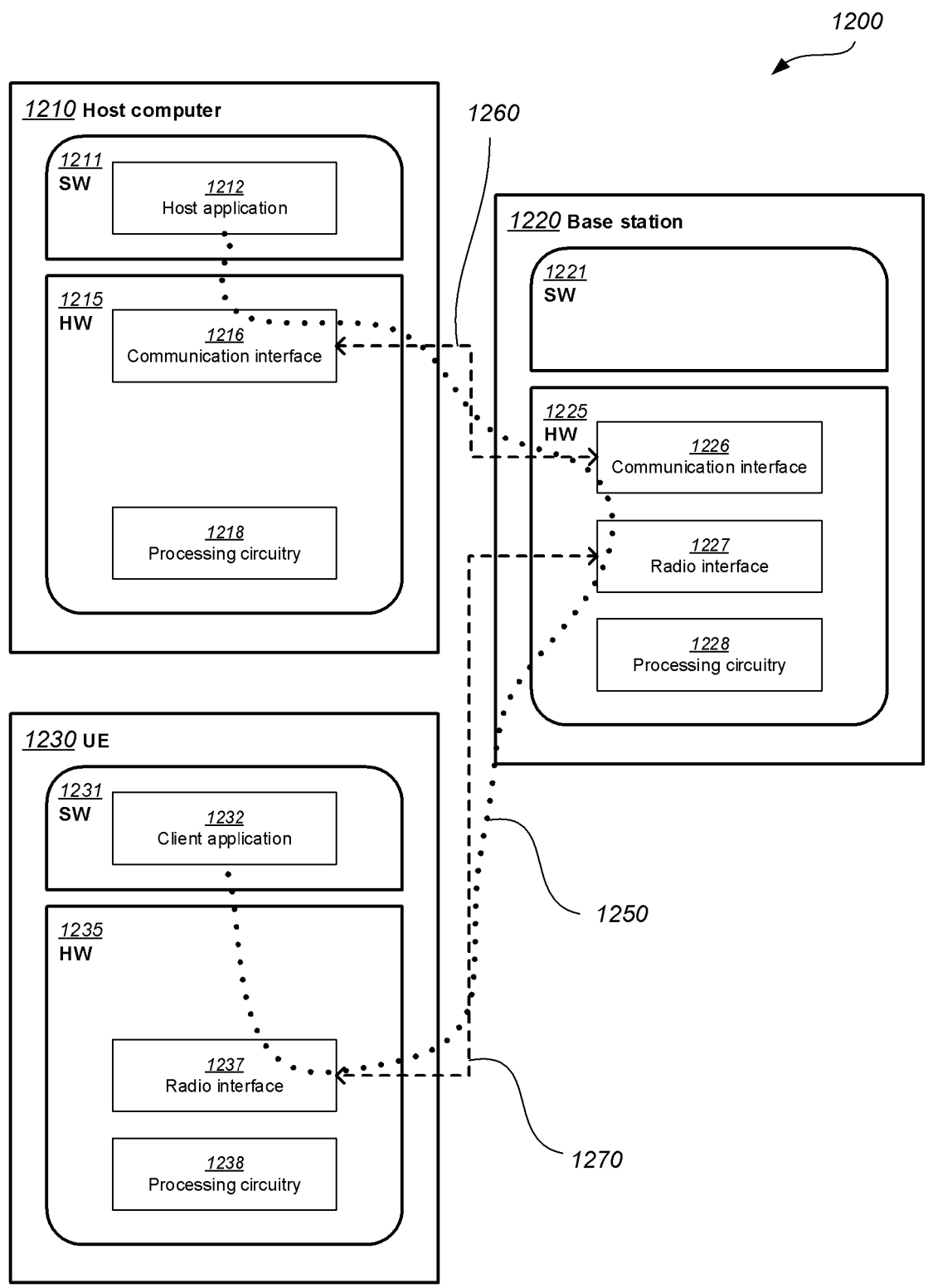
FIG. 12 is a generalized block diagram of a host computer communicating via a base station with a user equipment over a partially wireless connection.

It is noted that the host computer 1210, base station 1220 and UE 1230 illustrated in FIG. 12 may be identical to the host computer 1130, one of the base stations 1112a, 1112b, 1112c and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may improve data rate and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

Figure 13:
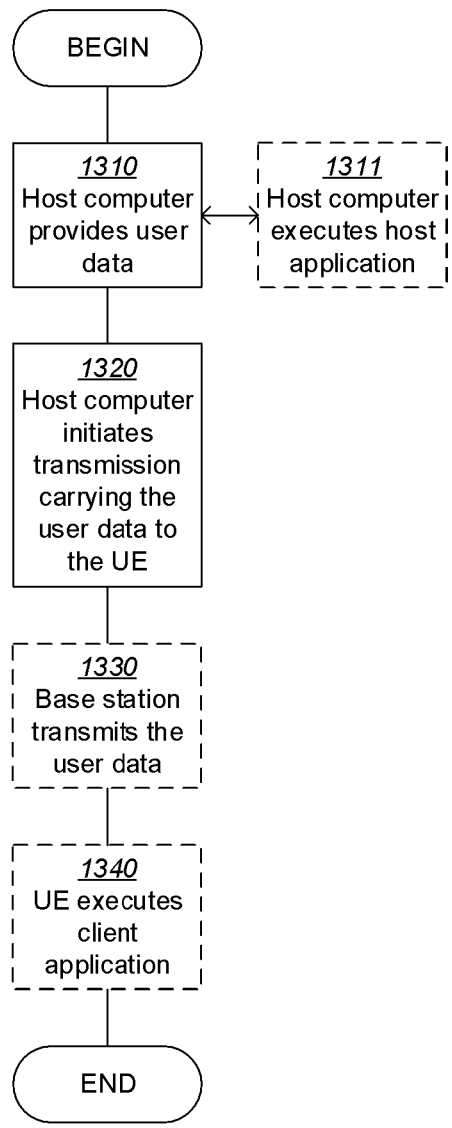

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

Figure 14:
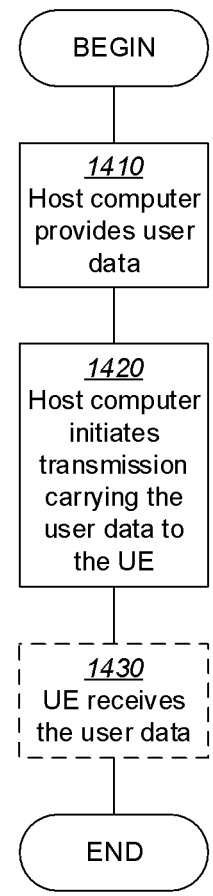

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 1410 of the method, the host computer provides user data. In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 1510 of the method, the UE receives input data provided by the host computer. Additionally or alternatively, in an optional second step 1520, the UE provides user data. In an optional substep 1521 of the second step 1520, the UE provides the user data by executing a client application. In a further optional substep 1511 of the first step 1510, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1530, transmission of the user data to the host computer. In a fourth step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 1610 of the method, in accordance with the teachings of the embodiments described throughout this disclosure, the base station receives user data from the UE. In an optional second step 1620, the base station initiates transmission of the received user data to the host computer. In a third step 1630, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for a network device to estimate uplink inter-cell interference, the method comprising:
   measuring an uplink inter-cell interference level for a first sector of a plurality of sectors served by the network device, wherein the plurality of sectors correspond to a respective plurality of angle ranges;

estimating an uplink inter-cell interference metric for the first sector based on the measured uplink inter-cell interference level; and estimating an uplink inter-cell interference level at a terminal device based on the uplink Inter-cell interference metric estimated for the first sector and an angular distance between the terminal device and a center of the first sector.

2. The method of claim 1, wherein estimating the uplink inter-cell interference metric for the first sector is further based on a previous uplink inter-cell interference metric for the first sector.

3. The method of claim 2, wherein said the uplink inter-cell interference metric for the first sector comprises calculating the uplink inter-cell interference metric based on the measured uplink inter-cell interference level, the previous uplink inter-cell interference metric, and a filtering coefficient over time.

4. The method of claim 1, wherein the uplink inter-cell interference level is measured for the first sector and the uplink inter-cell interference metric is estimated for the first sector per one or more of the following: frequency unit and time unit.

5. The method of claim 4, wherein the frequency unit is a sub-carrier and the time unit is a Transmission Time Interval (TTI).

6. The method of claim 1, wherein measuring the uplink inter-cell interference level for the first sector comprises:
measuring an uplink interference level for the first sector;
estimating a Multi-User (MU) interference level for the first sector; and
calculating the uplink inter-cell interference level by removing the MU interference level from the uplink interference level.

7. The method of claim 1, wherein one of the following applies:
the angle ranges corresponding to the plurality of sectors are equal;
at least two of the angle ranges corresponding to the plurality of sectors are different; or
the angle range corresponding to at least one sector of the plurality of sectors is determined by a number of terminal devices in the sector, an amount of traffic in the sector, or geography in the sector.

8. The method of claim 1, wherein estimating the uplink inter-cell interference metric for the first sector is further based on an uplink inter-cell interference metric for a second sector of the plurality of sectors.

9. A network device comprising:
a transceiver;
a processor operably coupled to the transceiver; and
a memory storing instructions executable by the processor, whereby the network device is operative to perform operations corresponding to the method of claim 1.

10. A method for a network device to estimate uplink inter-cell interference, the method comprising:
measuring an uplink inter-cell interference level for a first sector of a plurality of sectors served by the network device, wherein the plurality of sectors correspond to a respective plurality of angle ranges;

estimating an uplink inter-cell interference metric for a second sector of the plurality of sectors based on the uplink inter-cell interference level measured for the first sector; and estimating the uplink inter-cell interference metric for the second sector comprises calculating the uplink inter-cell interference metric based on the uplink inter-cell interference level measured for the first sector and a coefficient dependent on an angular distance between a center of the first sector and a center of the second sector.

11. The method of claim 10, wherein estimating the uplink inter-cell interference metric for the second sector is further based on a previous uplink inter-cell interference metric for the second sector.

12. The method of claim 11, wherein estimating the uplink inter-cell interference metric for the second sector comprises calculating the uplink inter-cell interference metric based on the uplink inter-cell interference level measured for the first sector, the previous uplink inter-cell interference metric for the second sector, a filtering coefficient over time, and a coefficient dependent on an angular distance between a center of the first sector and a center of the second sector.

13. The method of claim 10, wherein the uplink inter-cell interference level is measured for the first sector and the uplink inter-cell interference metric is estimated for the second sector per one or more of the following: frequency unit and time unit.

14. The method of claim 13, wherein the frequency unit is a sub-carrier and the time unit is a Transmission Time Interval (TTI).

15. The method of claim 10, further comprising estimating an uplink inter-cell interference level at a terminal device based on the uplink inter-cell interference metric estimated for the second sector and an angular distance between the terminal device and a center of the second sector.

16. The method of claim 10, wherein measuring the uplink inter-cell interference level for the first sector comprises:
measuring an uplink interference level for the first sector;
estimating a Multi-User (MU) interference level for the first sector; and
calculating the uplink inter-cell interference level by removing the MU interference level from the uplink interference level.

17. The method of claim 10, wherein one of the following applies:
the angle ranges corresponding to the plurality of sectors are equal;
at least two of the angle ranges corresponding to the plurality of sectors are different; or
the angle range corresponding to at least one sector of the plurality of sectors is determined by a number of terminal devices in the sector, an amount of traffic in the sector, or geography in the sector.

18. A network device comprising:
a transceiver;
a processor operably coupled to the transceiver; and
a memory storing instructions executable by the processor, whereby the network device is operative to perform operations corresponding to the method of claim 10.

* * * * *